(12) United States Patent
Lakshmanan et al.

(10) Patent No.: US 8,612,419 B2
(45) Date of Patent: Dec. 17, 2013

(54) INTELLIGENT CONTENT DISCOVERY FOR CONTENT CONSUMERS

(75) Inventors: Geetika T. Lakshmanan, Winchester, MA (US); Martin Oberhofer, Bondorf (DE)

(73) Assignee: International Business Machines Corporation, Armonk, NY (US)

(*) Notice: Subject to any disclaimer, the term of this patent is extended or adjusted under 35 U.S.C. 154(b) by 107 days.

(21) Appl. No.: 13/018,045

(22) Filed: Jan. 31, 2011

(65) Prior Publication Data

US 2012/0197861 A1    Aug. 2, 2012

(51) Int. Cl.
*G06F 17/30*    (2006.01)

(52) U.S. Cl.
USPC ....................................................... 707/709

(58) Field of Classification Search
USPC ............................ 707/3, 201, 709; 709/223
See application file for complete search history.

(56) References Cited

U.S. PATENT DOCUMENTS

| | | | |
|---|---|---|---|
| 7,328,216 B2 | 2/2008 | Hofmann et al. | |
| 2002/0091684 A1* | 7/2002 | Nomiyama et al. | 707/3 |
| 2005/0102282 A1 | 5/2005 | Linden | |
| 2006/0248059 A1* | 11/2006 | Chi et al. | 707/3 |
| 2007/0050338 A1* | 3/2007 | Strohm et al. | 707/3 |
| 2007/0162424 A1 | 7/2007 | Jeh et al. | |
| 2008/0065701 A1* | 3/2008 | Lindstrom et al. | 707/201 |
| 2008/0114756 A1 | 5/2008 | Konig et al. | |
| 2008/0250026 A1 | 10/2008 | Linden et al. | |
| 2009/0077033 A1 | 3/2009 | McGary et al. | |

* cited by examiner

*Primary Examiner* — Etienne Leroux
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for intelligent content discovery for content consumers in the global Internet. In an embodiment of the invention, a method for intelligent content discovery for content consumers includes parsing a list of previously viewed content in a content browser executing in memory of a computer to identify different content sources for the previously viewed content. The method also includes directing crawling of the content sources over a computer communications network to retrieve updated content from the content sources. The method yet further includes filtering the updated content into a subset of updated content according to at least one parameter corresponding to one of an end user profile of an end user and an end user preference of the end user. Finally, the method includes presenting a list of the subset of updated content in the content browser.

15 Claims, 1 Drawing Sheet

INTELLIGENT CONTENT DISCOVERY FOR CONTENT CONSUMERS

BACKGROUND OF THE INVENTION

1. Field of the Invention

The present invention relates to content consumption and more particularly to content discovery in a content distribution network such as the World Wide Web (the "Web").

2. Description of the Related Art

A content distribution network is a computer communications network supporting the dissemination of content such as documents, visual, audio and audiovisual material. The Web and its predecessor technologies represent the predominant mode of publically distributing content about the global Internet. In the circumstance of the Web, different content servers such as Web servers provide programmatic access to stored "pages" or to content dynamically assembled into pages at the request of different content consumers submitting requests for content to the content servers. The content consumers, in turn, utilize content rendering technologies such as Web browsers or media players to retrieve and render the requested content returned by the content servers.

The vast depth of the global Internet and in particular, the Web, complicates the ability of content consumers to locate content of interest for consumption. Recognizing this problem, search engines were developed nearly in parallel with the development of the Internet more than fifteen years ago. Today, terms such as "Google" have become synonymous with the concept of searching for content published in the Web. Still, discovering content through the use of a search engine requires the manual action of the end user to seek out content and to retrieve discovered content. To the extent an end user chooses not to search for content, content potentially of relevance to the end user will go undiscovered.

The notion of content syndication provides for an automated way in which content consumers can be made aware of content of interest without first requiring the content consumers to physically and manually search for the content of interest. The most popular form of content syndication utilizes the really simple syndication (RSS) protocol in which once a content user subscribes to content from a particular content source, the content user will be notified of changes to the content by way of a "feed". Yet, it is to be recognized that even for RSS feeds, the content consumer at some point must choose to receive syndicated content from a particular source. Content from content sources unknown a priori to the content consumer will remain undiscovered.

The direct marketing industry for many decades has capitalized on the knowledge of individual preferences to push paper content of potential interest to the consumer. In this regard, for many years, subscribers could complete a form survey of interests in exchange for a free subscription to content. Using the form survey, additional unknown content could be sent by regular mail to the subscriber—generally in the form of direct mail. Thus, while this manual form of intelligent syndication of advertising content had proven effective over the years, this manual form of intelligent syndication has not been similarly effective within the global Internet in the delivery of solicited commercial electronic mail.

BRIEF SUMMARY OF THE INVENTION

Embodiments of the present invention address deficiencies of the art in respect to content discovery in a computer communications network and provide a novel and non-obvious method, system and computer program product for intelligent content discovery for content consumers in the global Internet. In an embodiment of the invention, a method for intelligent content discovery for content consumers includes parsing a list of previously viewed content in a content browser executing in memory of a computer to identify different content sources for the previously viewed content. The method also includes directing crawling of the content sources over a computer communications network to retrieve updated content from the content sources. Finally, the method includes presenting a list of the updated content in the content browser.

In another embodiment of the invention, a content discovery data processing system can be configured for intelligent content discovery for content consumers. The system can include a host computer with at least one processor and memory and a content browser executing in the memory of the host computer. The system further can include a content discovery module executing in the memory of the host computer. The module can include program code enabled to parse a list of previously viewed content in the content to identify different content sources for the previously viewed content, to direct crawling of the content sources over a computer communications network to retrieve updated content from the content sources, to filter the updated content into a subset of updated content according to at least one parameter corresponding to one of an end user profile of an end user and an end user preference of the end user, and to present a list of the subset of updated content in the content browser. Optionally, the list of previously viewed content is stored in a graph of previously visited Web pages, the graph comprising different nodes arranged in sequence according to a sequence in which the Web pages had been visited.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for intelligent content discovery for content consumers in the global Internet. In accordance with an embodiment of the invention, a user profile can be established for a content consumer. Past content retrieved from corresponding content sources in the global Internet and rendered in a content browser in response to direction by the content consumer can be compared to the user profile and ranked according to relevance to the user profile. Thereafter, content updates provided by higher ranked content sources can be included in a content recommendation provided to the content consumer. In this way, content of likely interest to the content consumer, but previously unknown to the content consumer can be automatically discovered by the content consumer without requiring the content consumer to proactively engage a search engine or syndication fee subscription to locate the discovered content.

Figure 1:
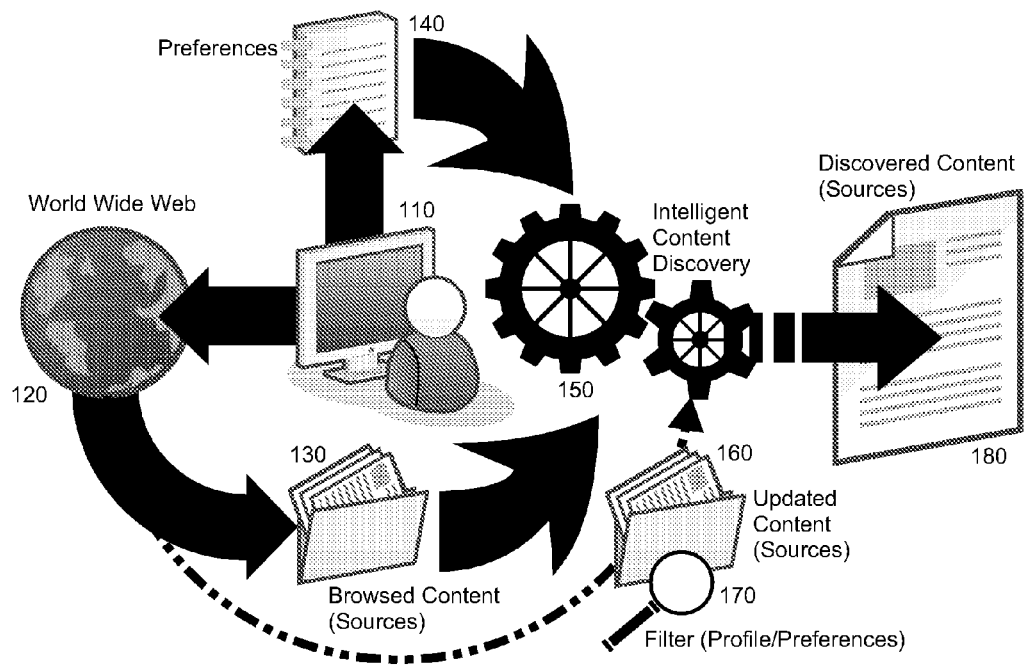
FIG. 1 is a pictorial illustration of a process for intelligent content discovery for content consumers in the global Internet.

In further illustration, FIG. 1 pictorially shows a process for intelligent content discovery for content consumers in the global Internet. As shown in FIG. 1, an end user 110 can browse content 130 retrieved over a content distribution network 120 such as the Web. The browsed content 130 can include different pages of a Web site and a record of the browsed content 130 can be maintained for the end user 110, such as by way of a history file. Additionally, user preferences 140 for content for the end user 110 can be established, such as by way of a manual specification of a user profile of user preferences by the end user 110, or by the automated retrieval of a user profile of user preferences through an interface to one or more social networking sites.

Intelligent content discovery logic 150 can process the browsed content 130 to identify different content sources of the browsed content 130. For instance, a graph of browsing patterns of the end user 110 can be computed based upon a sequence of pages visited amongst the browsed content 130. From the graph, a listing of a sequence of sources of the content can be determined and the pages accessible at each source of the browsed content 130 can be crawled to locate updated content 160. Optionally, the updated content 160 can be subjected to a filter 170 according to the user preferences 140 to produce a subset of the updated content 160.

For example, keywords in the profile and/or preferences 140 can be matched to terms in the updated content 160 in order to select pages of interest in the subset of the updated content 160. Finally, the subset of the updated content 160 can be included in a listing of discovered content 180 to be provided to the end user 110 for follow up. In this way, content of interest to the end user 110 based upon past browsing patterns and a known preference and/or profile can be automatically presented to the end user 110 without requiring the end user 110 to manually locate the content of interest.

Figure 2:
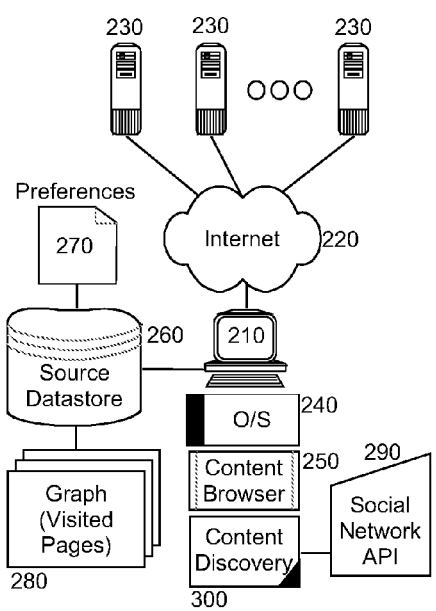
FIG. 2 is a schematic illustration of a content discovery data processing system configured for intelligent content discovery for content consumers in the global Internet; and, FIG. 3 is a flow chart illustrating a process for intelligent content discovery for content consumers in the global Internet.

The process described in connection with FIG. 1 can be implemented in a content discovery data processing system. In yet further illustration, FIG. 2 schematically shows a content discovery data processing system configured for intelligent content discovery for content consumers in the global Internet. The system can include a computer 210 configured for communicative coupling to different content sources 230 of content in a content distribution network 220. The computer 210 can include at least one processor and memory and can host the execution of an operating system 240. The operating system 240 in turn can support the operation of a content browser 250 through which requests for content issued over the content distribution network 220 can be satisfied with content from one or more content sources 230 and rendered therein.

Of note, a source datastore 260 can be coupled to the computer 210 and can include a listing of those of the content sources 230 visited previously and, a listing of different pages viewed at the content sources 230. Optionally, a graph 280 can be stored in connection with the source datastore 260 of the pages visited previously in relationship to one another so that pages visited in sequence are represented by a branch of nodes, each node representative of a visited page. Finally, a table 270 storing preferences data for an end user can be included in connection with the source datastore 260 such as the basic attributes of the end user, and content preferences preferred by the end user. Optionally, the table 270 can be populated with data automatically through the use of an application programming interface (API) 290 to a social networking system.

Of import, a content discovery module 300 can be coupled to the content browser 250. The content discovery module 300 can include program code that when executed in the memory of the computer 210 can extract from the graph 280 a selection of content sources in the source datastore 260 for previously visited content and can direct the crawling of those content sources to retrieve updated content accessible at the content sources—even if the updated content resides in content such as a page not previously viewed by the end user. The program code when executed in memory of the computer 210 further can filter the updated content to reduce the updated content to a subset reflective of the profile of the end user and/or the preferences of the end user expressed in the table 270.

In its most basic form, updated content including terms matching those in the table 270 can be selected for inclusion in the subset. In a more sophisticated embodiment, rankings of different terms in the table 270 can result in ranking updated content with terms matching higher ranked ones of the terms as more likely to be included in the subset than other updated content. Finally, the program code when executed in the memory of the computer 210 can present a listing of the subset of the updated content to the end user, for instance in a message with hyperlinks to the updated content, or in a Web page loaded upon launching of the content browser 240.

Figure 3:
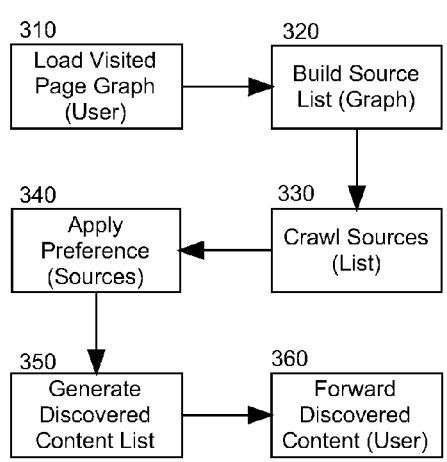

In even yet further illustration of the operation of the content discovery module 300, FIG. 3 is a flow chart illustrating a process for intelligent content discovery for content consumers in the global Internet. Beginning in block 310, a graph of visited pages for an end user can be loaded for processing. In block 320, a source list of content sources for the visited pages can be constructed. Thereafter, in block 330 the content sources included in the source list can be crawled to identify updated content. In block 340, the updated content can be filtered according to one or more parameters evident in a profile for the end user, or one or more preferences established by the end user. Thereafter, in block 350 a list of the filtered updated content can be generated and delivered to the end user in block 360.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for intelligent content discovery for content consumers comprising:
    parsing a list of previously viewed content in a content browser executing in memory of a computer to identify different content sources for the previously viewed content;

directing crawling of the content sources over a computer communications network to retrieve updated content from the content sources; and, presenting the updated content in the content browser.

2. The method of claim 1, wherein parsing a list of previously viewed content, comprises:

loading a graph of previously visited Web pages, the graph comprising different nodes arranged in sequence according to a sequence in which the Web pages had been visited; and, determining at each node an identity of a content source for a Web page represented by the node.

3. The method of claim 1, further comprising:

filtering the updated content into a subset of updated content according to at least one parameter corresponding to one of an end user profile of an end user and an end user preference of the end user; and, presenting a list of the subset of the updated content in the content browser.

4. The method of claim 3, wherein filtering the updated content into a subset of updated content according to at least one parameter corresponding to one of an end user profile and an end user preference, comprises matching at least one term in the updated content to at least one term corresponding to the at least one parameter.

5. The method of claim 4, wherein filtering the updated content into a subset of updated content according to at least one parameter corresponding to one of an end user profile and an end user preference, further comprises favoring updated content for inclusion in the subset responsive to determining a higher ranking applied to the at least one term corresponding to the at least one parameter than a ranking applied to other terms.

6. The method of claim 1, further comprising determining the parameter by extracting data for the end user through an application programming interface (API) to a social networking system.

7. A content discovery data processing system configured for intelligent content discovery for content consumers, the system comprising:

a host computer with at least one processor and memory;

a content browser executing in the memory of the host computer; and, a content discovery module executing in the memory of the host computer, the module comprising program code enabled to parse a list of previously viewed content in the content to identify different content sources for the previously viewed content, to direct crawling of the content sources over a computer communications network to retrieve updated content from the content sources, and to present a list of the updated content in the content browser.

8. The system of claim 7, wherein the list of previously viewed content is stored in a graph of previously visited Web pages, the graph comprising different nodes arranged in sequence according to a sequence in which the Web pages had been visited.

9. The system of claim 7, wherein the updated content is filtered by the module into a subset of updated content according to at least one parameter corresponding to one of an end user profile of an end user and an end user preference of the end user, and wherein the subset of the updated content is presented by the module in the content browser.

10. A computer program product for intelligent content discovery for content consumers, the computer program product comprising:

a computer readable storage medium having computer readable program code embodied therewith, the computer readable program code comprising:

computer readable program code for parsing a list of previously viewed content in a content browser executing in memory of a computer to identify different content sources for the previously viewed content;

computer readable program code for directing crawling of the content sources over a computer communications network to retrieve updated content from the content sources; and, computer readable program code for presenting a list of the updated content in the content browser.

11. The computer program product of claim 10, wherein the computer readable program code for parsing a list of previously viewed content, comprises:

computer readable program code for loading a graph of previously visited Web pages, the graph comprising different nodes arranged in sequence according to a sequence in which the Web pages had been visited; and, computer readable program code for determining at each node an identity of a content source for a Web page represented by the node.

12. The computer program product of claim 10, further comprising:

computer readable program code for filtering the updated content into a subset of updated content according to at least one parameter corresponding to one of an end user profile of an end user and an end user preference of the end user; and, computer readable program code for presenting a list of the subset of the updated content in the content browser.

13. The computer program product of claim 12, wherein the computer readable program code for filtering the updated content into a subset of updated content according to at least one parameter corresponding to one of an end user profile and an end user preference, comprises computer readable program code for matching at least one term in the updated content to at least one term corresponding to the at least one parameter.

14. The computer program product of claim 13, wherein the computer readable program code for filtering the updated content into a subset of updated content according to at least one parameter corresponding to one of an end user profile and an end user preference, further comprises computer readable program code for favoring updated content for inclusion in the subset responsive to determining a higher ranking applied to the at least one term corresponding to the at least one parameter than a ranking applied to other terms.

15. The computer program product of claim 10, further comprising computer readable program code for determining the parameter by extracting data for the end user through an application programming interface (API) to a social networking system.

* * * * *